United States Patent
Jallouli et al.

(10) Patent No.: US 7,217,440 B2
(45) Date of Patent: May 15, 2007

(54) PROCESS FOR REPLACING AN INITIAL OUTERMOST COATING LAYER OF A COATED OPTICAL LENS WITH A DIFFERENT COATING LAYER OR BY DEPOSITING THEREON A DIFFERENT COATING LAYER

(75) Inventors: Agnès de Leuze Jallouli, Largo, FL (US); Gérald Fournand, Tampa, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 670 days.

(21) Appl. No.: 10/461,091

(22) Filed: Jun. 13, 2003

(65) Prior Publication Data

US 2004/0253369 A1    Dec. 16, 2004

(51) Int. Cl.
B05D 5/06    (2006.01)

(52) U.S. Cl. .................. 427/162; 427/166; 427/167; 427/255.6; 427/255.7; 427/402; 427/561

(58) Field of Classification Search ............... 427/162, 427/166, 167, 255.6, 255.7, 402, 561
See application file for complete search history.

(56) References Cited

U.S. PATENT DOCUMENTS

| | | | |
|---|---|---|---|
| 4,211,823 A | 7/1980 | Suzuki et al. | 428/412 |
| 4,410,563 A | 10/1983 | Richter et al. | 422/108 |
| 4,478,873 A | 10/1984 | Masso et al. | 427/40 |
| 4,590,117 A | 5/1986 | Taniguchi et al. | 428/212 |
| 4,687,707 A | 8/1987 | Matsuo et al. | 428/336 |
| 4,761,436 A | 8/1988 | Kohno et al. | 522/114 |
| 5,015,523 A | 5/1991 | Kawashima et al. | 428/336 |
| 5,104,692 A | 4/1992 | Belmares | 427/164 |
| 5,173,368 A | 12/1992 | Belarmes | 428/426 |
| 5,316,791 A | 5/1994 | Farber et al. | 427/464 |
| 5,433,745 A * | 7/1995 | Graham et al. | 623/5.16 |
| 6,090,489 A * | 7/2000 | Hayakawa et al. | 428/409 |
| 6,183,872 B1 | 2/2001 | Tanaka et al. | 428/429 |
| 6,277,485 B1 * | 8/2001 | Invie et al. | 428/336 |
| 6,436,481 B1 * | 8/2002 | Chabrecek et al. | 427/488 |
| 6,451,871 B1 * | 9/2002 | Winterton et al. | 523/106 |
| 6,991,826 B2 * | 1/2006 | Pellerite et al. | 427/164 |
| 2002/0026006 A1 * | 2/2002 | Garcia et al. | 524/591 |

FOREIGN PATENT DOCUMENTS

| | | |
|---|---|---|
| EP | 0203730 | 4/1986 |
| EP | 0404111 | 6/1990 |
| EP | 0749021 | 6/1996 |
| EP | 0844265 | 8/1996 |
| EP | 0933377 | 1/1999 |
| EP | 1279443 | 7/2002 |
| FR | 2407232 | 5/1979 |
| FR | 2550726 | 2/1985 |
| FR | 2845636 | 4/2004 |
| JP | 63-87223 | 9/1986 |
| JP | 63-141001 | 12/1986 |
| JP | 2000-308846 | 4/1999 |
| WO | WO 94/10230 | 11/1993 |
| WO | WO 01/68384 | 3/2001 |

* cited by examiner

*Primary Examiner*—Alain L. Bashore
(74) *Attorney, Agent, or Firm*—Fulbright & Jaworski L.L.P.

(57) ABSTRACT

The invention concerns a process for replacing an initial outermost coating layer of a coated optical lens with a layer of a new final coating having surface properties different from those of said initial outermost coating which comprises:

(a) providing a coated optical lens having an initial outermost coating layer having a surface contact angle with water of at least 65°;

(b) subjecting the initial outermost coating layer to a treatment with activated chemical species at about atmospheric pressure, and for less than one minute, in order there is obtained a treated surface having a contact angle with water of 10° or less; and (c) depositing on said treated surface a layer of a final coating having surface properties different from those of said initial outermost coating.

41 Claims, No Drawings

PROCESS FOR REPLACING AN INITIAL OUTERMOST COATING LAYER OF A COATED OPTICAL LENS WITH A DIFFERENT COATING LAYER OR BY DEPOSITING THEREON A DIFFERENT COATING LAYER

BACKGROUND OF THE INVENTION

The present invention concerns in general a process for replacing an initial outermost coating layer of a coated optical lens, in particular an ophthalmic lens, with or depositing thereon a layer of a new final coating having surface properties different of those of the initial outermost coating layer.

It has become more and more common in the manufacture of ophthalmic lenses to coat the lenses with one or several functional coating layers for imparting to the resulting ophthalmic lenses various properties such as impact resistance, scratch-resistance, anti-reflective and anti-soiling properties.

Thus, a typical ophthalmic lens may comprise a substrate made of an optically transparent material, such as mineral glass or organic glass, having at least one of its main surfaces coated, successively, with a primer coating layer, a scratch-resistant coating layer, an anti-reflective coating layer, and anti-soiling coating layer (hydrophobic and/or oleophobic top coat).

Typically, the outermost coating layer of an ophthalmic lens is the anti-soiling coating layer (or top coat).

In view of the fast development in the top coat technology, it would be of interest to be able to safely replace an initially deposited hydrophobic top coat by a new top coat having different or improved properties.

Of course, such a replacement of the outermost coating layer by an other one must be effective without adversely affecting the underneath coating layers and/or the substrate, in particular their optical properties.

In particular, the top coat is usually deposited onto an anti-reflective coating layer and the replacement process should not impair the properties of this anti-reflective coating layer.

Also, an ophthalmic lens results of a succession of molding and/or surfacing/polishing operations which determine the geometry of both convex and concave optical surfaces of the lens, and thereafter of appropriate surface treatment as indicated above. The last finition touch of an ophthalmic lens is the edging step which consists in machining the rim or periphery of the lens to conform it to required dimensions for adaptation of the lens into the spectacle mount in which it is intended to be placed.

Edging is generally done on a machine comprising diamond wheels which perform the above defined machining.

The lens is maintained, during this operation, by axial blocking means.

The relative movement of the lens with regard to the wheel is generally numerically controlled in order to obtained the desired shape.

It is thus absolutely necessary that the lens be firmly maintained during the movement.

To this end, before the edging operation a maintaining means is positioned onto the convex surface of the lens.

A maintaining pad, such as an adhesive wafer, for example a double face adhesive, is placed between the maintaining means and the convex surface of the lens.

The thus equipped lens is then positioned on one of the above mentioned axial blocking means, and the other axial blocking means exerts a pressure on the concave face of the lens, through an elastomeric stop.

During machining, a tangent torque is applied onto the lens which may induce a rotation of the lens relatively to the maintaining means if the lens is not sufficiently strongly maintained.

A good blocking of the lens principally depends upon a good adhesion at the interface between the maintaining pad and the convex surface of the lens.

As already mentioned, the outermost coating layer of an ophthalmic lens usually comprises a hydrophobic and/or oleophobic anti-soiling top coat generally formed onto an anti-reflective coating.

One problem associated with such top coats, is that, due to their surface properties, they do no permit to obtain a good adhesion of the interface between the maintaining pad and the convex surface of the lens, this lack of adhesion increasing with the increase of efficiency of the hydrophobic and/or oleophobic top coat.

Therefore, it will be of interest to produce ophthalmic lens with an outermost coating which results in a good adhesion with the maintaining pad for the edging operation and thereafter be able to replace this initial outermost coating by a more efficient or appropriate final coating layer depending on the intended final use.

The document WO 01/68384 discloses an apparatus and method for producing a high energy marking on a surface of an ophthalmic lens, such as a corona discharge, to increase the surface energy of the exposed area and obtain a resulting marking visible by fogging. Only a very small area of the lens surface is exposed and partial removal of the subjacent coating or substrate may be tolerated as it does not affect the optical properties of the lens.

Japanese unexamined patent application laid open 2000-308846 discloses forming an anti-fouling layer having excellent anti-fouling, scratch-resistance and solvent resistance by subjecting the surface of a base material, such as an optical part to a pre-treatment. Pre-treatment can be high frequency plasma, electron beam, ion beam, vapor deposition, sputtering, alkali, acid, corona discharge or atmospheric pressure glow discharge method.

The treated surface can be the outer surface of an anti-reflecting layer. It is further precised that the surface energy of anti-reflecting film is as high as 60 J/m$^2$. Therefore, due to the very high surface energy, the surface treated is the surface of a mineral layer, typically a SiO$_2$ layer of an anti-reflecting stack.

SUMMARY OF THE INVENTION

Thus, the aim of the present invention is to provide a process for replacing an initial outermost coating layer of a coated optical lens with a layer of a new final coating having surface properties different of those of the initial outermost coating without detrimentally affecting the properties, in particular the optical properties, of the subjacent functional layer and/or the lens substrate.

According to the invention, there is provided a process for replacing an initial outermost coating layer of a coated optical lens with or depositing on said initial outermost coating layer a layer of a new final coating having surfaces properties different from those of said initial outermost coating layer which comprises:

(a) providing a coated optical lens having an initial outermost coating layer having a surface contact angle with water of at least 65°;

(b) subjecting the initial outermost coating layer to a treatment with activated chemical species at about atmospheric pressure and for less than one minute in order to obtain a treated surface having a contact angle with water of 10° or less;

(c) depositing on said treated surface a layer of a final coating having surface properties different from those of said initial outermost coating layer.

In another embodiment of the invention, the process comprises, before treatment step (b) or after treatment step (b) and before deposition step (c) of the final coating layer, an edging step of the lens.

DETAILED DESCRIPTION OF THE INVENTION

An essential step of the process of the invention is treatment step (b).

It shall be understood that, in treatment step (b), almost the entire surface of the lens and preferably the whole surface of the lens is treated.

Preferably, the duration of the treatment of the initial outermost coating layer with activated chemical species is 40 seconds or less and more preferably 30 seconds or less and even better is about 20 seconds, and preferably the treated surface has a contact angle with water of 10° or less, and even better 5° or less.

By definition, the duration of the treatment with activated chemical species is the time during which each point of the surface of the initial outermost coating layer is in contact with the activated chemical species.

If not mentioned, by surface contact angle with water, it is meant the stationary contact angle with water determined according to the liquid drop method in which a water drop having a diameter smaller than 2 mm is formed on the optical article and the contact angle is measured.

Essentially, the active chemical species are free radicals, and in particular oxygen free radicals.

In order to uniformize the action of the activated chemical species on the entire surface of the lens, it is recommended to blow air during treatment step (b).

A constant flow of air is blown between the two electrodes. It deflects the arc or plasma produced and causes it to spread on the surface of the material to treat. Three dimensional objects such as lenses can then be treated.

The preferred treatment with activated chemical species are corona discharge treatments and atmospheric pressure plasma treatments, in particular corona discharge treatments.

Typically, the power of the corona discharge treatment ranges from $10^2$ to $2.10^3$ W, preferably $5.10^2$ to $10.^3$ W.

For example, the corona discharge treatment may be effected using a corona discharge unit from 3 DT, model Multidyne 800 Watts with a discharge of 12 KV per electrode.

The lower frequencies are preferred for reasons of safety, although higher frequencies, e.g. 2000 Hz, will provide good results.

The preferred atmospheric pressure plasma treatment is an oxygen plasma treatment.

Usually, the power of the plasma treatment ranges from $10^2$ to $10^3$ W, and will generally be around $6.10^2$ W.

An important feature of the treatment step (b) of the process of the invention is that it is performed at atmospheric pressure. By atmospheric pressure, it is meant a pressure ranging from 250 to 760 mm Hg, preferably 600 to 760 mm Hg.

Preferably, the initial outermost coating will have a surface energy of at least 20 mJ/m$^2$, more preferably at least 15 mJ/m$^2$ or better at least 13 mJ/m$^2$, but also preferably less than 35 mJ/m$^2$ and even better less than 30 mJ/m$^2$, and a thickness of 1 to 100 nm, preferably 1 to 60 nm, more preferably 10 to 60 nm. The initial outermost coating may also be as thin as 1 to 10 nm, preferably 1 to 5 nm.

In the present invention, all surface energies are calculated according to the OWENS-WENDT method described in the following document: "Estimation of the surface forces energy of polymers" OWENS D. K., WENDT R. G. (1969) J. APPL. POLYM, SCI., 13, 1741–1747.

The initial outermost coating layer may be any classical outer coating in the field of optical lenses and in particular an anti-soiling coating (hydrophobic and/or oleophobic top coat), an external surface portion of a scratch-resistant coating, or an outermost coating of an antireflective stack.

The initial outermost coating layer according to the invention is preferably of organic nature. By organic nature in the present invention, it is meant a layer which is comprised of at least 40% by weight, preferably at least 50% by weight of the total weight of the coating layer of organic materials.

A preferred initial outermost coating layer is a hydrophobic and/or oleophobic top coat, and preferably such a top coat made from a composition comprising at least one fluorinated compound.

Preferred fluoro compounds are silanes and silazanes bearing at least one group selected from fluorocarbons, polyfluorocarbons, fluoropolyethers and polyfluoropolyethers, in particular perfluoropolyethers.

Fluorocompounds are disclosed, among others, in U.S. Pat. No. 4,410,563, EP-0 203 730, EP-749 021, EP-844 265 and EP-933 377.

Among fluorosilanes there may be cited the compounds of formulas:

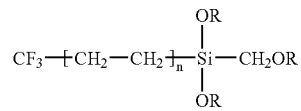

n=5, 7, 9 or 11 and R is an alkyl radical, typically a $C_1$–$C_{10}$ alkyl radical such as —CH$_3$, —C$_2$H$_5$ and —C$_3$H$_7$;

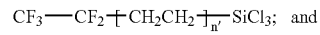

n'=7 or 9 and R is as defined above.

Compositions containing fluoro compounds also useful for making the top coat are disclosed in U.S. Pat. No. 6,183,872.

The silicon-containing organic fluoropolymer of U.S. Pat. No. 6,183,872 is represented by the general formula and has a number average molecular weight of from $5 \times 10^2$ to $1 \times 10^5$.

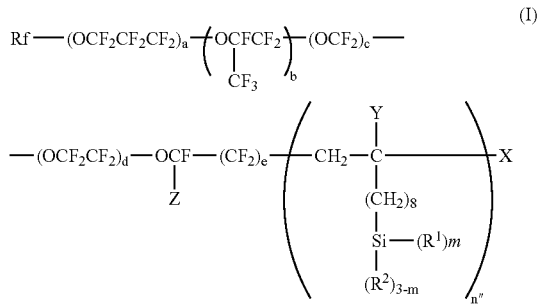

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occuring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; I represents 0, 1 or 2; m represents 1, 2 or 3; and n" represents an integer of 1 or above, preferably 2 or above.

An other class of preferred compositions for forming the initial top coat are those containing fluoropolyether groups, in particular polyfluoropolyether groups and in particular perfluoropolyether groups. A particular preferred class of compositions containing fluoropolyether groups is disclosed in U.S. Pat. No. 6,277,485.

The anti-soiling top coats of U.S. Pat. No. 6,277,485 are at least partially cured coatings comprising a fluorinated siloxane prepared by applying a coating composition (typically in the form of a solution) comprising at least one fluorinated silane of the following formula:

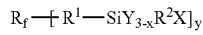

wherein: $R_f$ is a monovalent or divalent polyfluoropolyether group, $R^1$ is a divalent alkylene group, arylene group, or combinations thereof, optionally containing one or more heteroatoms or functional groups and optionally substituted with halids, and preferably containing 2 to 16 carbon atoms; $R^2$ is a lower alkyl group (i.e., a($C_1$-$C_4$) alkyl group); Y is a halid, a lower alkoxy group (i.e., a($C_1$-$C_4$) alkoxy group, preferably, a methoxy or ethoxy group), or a lower acyloxy group (i.e., —OC(O)$R^3$ wherein $R^3$ is a ($C_1$-$C_4$) alkyl group); x is 0 or 1; and y is 1 ($R_f$ is monovalent) or 2 ($R_f$ is divalent). Suitable compounds typically have a molecular weight (number average) of at least about 1000. Preferably, Y is a lower alkoxy group and $R_f$ is a perfluoropolyether group.

A commercial composition for making the top coat is the composition KP 801M commercialized by SHINETSU.

Generally, the initial outermost coating layer of the coated lens has a thickness ranging from 1 to 100 nm, preferably 1 to 60 nm, more preferably 1 to 5 nm.

Preferably, the initial hydrophobic top coat of the coated lens is deposited on an anti-reflecting coating.

Anti-reflecting coatings and their methods of making are well known in the art. The anti-reflecting coating can be any layer or stack of layers which improve the anti-reflective properties of the finished lens.

The anti-reflecting coating may preferably consist of a mono or multilayer film of dielectric materials such as SiO, $SiO_2$, $Si_3N_4$, $TiO_2$, $ZrO_2$, $La_2O_3$, $MgF_2$ or $Ta_2O_5$ or mixtures thereof.

The anti-reflecting coating can be applied in particular by vacuum deposition according to one of the following techniques:
1. by evaporation, optionally ion beam assisted
2. by spraying using an ion beam;
3. by cathode sputtering; or
4. by plasma assisted vapor—phase chemical deposition.

In case where the film includes a single layer, its optical thickness must equal to $\lambda/4$ where $\lambda$ is a wavelength of 450 to 650 nm.

Preferably, the anti-reflecting coating is a multilayer film comprising three or more dielectric material layers of alternatively high and low refractive indexes.

A preferred anti-reflecting coating comprises a stack of four layers formed by vacuum deposition, for example a first $ZrO_2$ layer having an optical thickness of about 35 to 75 nm, a second $SiO_2$ layer having an optical thickness of about 20 to 40 nm, a third $ZrO_2$ layer having an optical thickness of about 120 to 190 nm and a fourth $SiO_2$ layer having an optical thickness of about 100 to 160 nm (optical thickness are for a wavelength $\lambda$=550 nm).

As already indicated, the coated lens preferably comprises a scratch-resistant coating layer, the anti-reflecting coating layer being typically deposited on the scratch-resistant coating layer.

Any know optical scratch-resistant coating composition can be used to form the scratch-resistant coating. Thus, the scratch-resistant coating composition can be a UV and/or a thermal curable composition.

By definition, a scratch-resistant coating is a coating which improves the abrasion resistance of the finished optical article as compared to a same optical article but without the scratch-resistant coating.

Preferred scratch-resistant coatings are those made by curing a precursor composition including epoxyalkoxysilanes or a hydrolyzate thereof and a curing catalyst. Preferably the scratch resistant coatings contain at least one inorganic filler such as $SiO_2$ and/or metal oxides colloids. Examples of such compositions are disclosed in U.S. Pat. No. 4,211,823, WO 94/10230, U.S. Pat. No. 5,015,523.

The most preferred scratch-resistant coating compositions are those comprising as the main constituents an epoxyalkoxysilane such as, for example, γ-glycidoxypropyltrimethoxysilane (GLYMO) and a dialkyldialkoxysilane such as, for example dimethyldiethoxysilane (DMDES), colloidal silica and a catalytic amount of a curing catalyst such as aluminum acetylacetonate or a hydrolyzate thereof, the remaining of the composition being essentially comprised of solvents typically used for formulating these compositions.

The scratch-resistant coating may comprise an effective amount of at least one coupling agent.

The preferred coupling agent is a pre-condensed solution of an epoxyalkoxysilane and an unsatured alkoxysilane, preferably comprising a terminal ethylenic double bond.

Examples of epoxyalkoxysilanes are γ-glycidoxypropyltermethoxysilane, γ-glycidoxyprolylpentamethyldisiloxane, γ-glycidoxypropylmethyldiisopropenoxysilane, (γ-glycidoxypropyl)-methyldiethoxysilane, γ-glycidoxypropylmethylethoxysilane, γ-glycidoxypropyldiisopropylethoxysilane and (γ-glycidoxypropyl)bis(trimethylsiloxy) methylsilane.

The preferred epoxyalkoxysilane is (γ-glycidoxypropyl) trimethoxysilane.

The unsatured alkoxysilane can be a vinylsilane, an allylsilane, an acrylic silane or a methacrylic silane.

Examples of vinylsilanes are vinyltri(2-methoxyethoxy) silane, vinyltrisisobutoxysilane, vinyltri-t-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylmethyldiacetoxysilane, vinylbis(trimethylsiloxy)silane and vinyldimethoxyethoxysilane.

Examples of allylsilanes are allyltrimethoxysilane, alkyltriethoxysilane and allyltris(trimethylsiloxy)silane.

Examples of acrylic silanes are 3-acryloxypropyltris (trimethylsiloxy)silane, 3-acryloxypropyltrimethoxysilane, acryloxypropylmethyldimethoxysilane, 3-acryloxypropylmethylbis(trimethylsiloxy)silane, 3-acryloxypropyldimethylmethoxysilane, n-(3-acryloxy-2-hydroxypropyl)-3-aminopropyltriethoxysilane.

Examples of methacrylic silanes are 3-methacryloxypropyltris (vinyldimethoxysiloxy)silane, 3-methacryloxypropyltris (trimethylsiloxy)silane, 3-methacryloxypropyltris (methoxyethoxy)silane, 3-metacryloxypropyltrimethoxysilane, 3-methacryloxypropylpentamethyl disiloxane, 3-methacryloxypropylmethyldimethoxysilane, 3-methacryloxpropylmethyldiethoxysilane, 3-methacryloxypropyldimethyl methoxysilane, 3-methacryloxypropyldimethylethoxysilane, 3-methacryloxypropenyltrimethoxysilane and 3-methacryloxypropylbis (trimethylsiloxy)methylsilane.

The preferred silane is acryloxypropyltrimethoxysilane.

Preferably, the amounts of epoxyalkoxysilane(s) and unsaturated alkoxysilane(s) used for the coupling agent preparation are such that the weight ratio.

$$R = \frac{\text{weight of epoxyalkoxysilane}}{\text{weight of unsaturated alkoxysilane}}$$

verifies the condition $0.8 \leq R \leq 1.2$.

The coupling agent preferably comprises at least 50% by weight of solid material from the epoxyalkoxysilane(s) and unsaturated alkoxysilane(s) and more preferably at least 60% by weight.

The coupling agent preferably comprises less than 40% by weight of liquid water and/or organic solvent, more preferably less than 35% by weight.

The expression "weight of solid material from epoxyalkoxy silanes and unsaturated alkoxysilanes" means the theoretical dry extract from those silanes which is the calculated weight of unit $Q_k Si O_{(4-K)/2}$ $Q_k Si O_{(4-K)/2}$ comes from $Q_k Si R'O_{(4-k)}$ where Si R' reacts to form Si OH on hydrolysis.

k is an integer from 1 to 3 and is preferably equal to 1.

R' is preferably an alkoy group such as $OCH_3$.

The water and organic solvents referred to above come from those which have been initially added in the coupling agent composition and the water and alcohol resulting from the hydrolysis and condensation of the alkoxysilanes present in the coupling agent composition.

Preferred preparation methods for the coupling agent comprises:
1) mixing the alkoxysilanes;
2) hydrolysing the alkoxysilanes, preferably by addition of an acid, such as hydrochloric acid;
3) stirring the mixture;
4) optionally adding an organic solvent;
5) adding one or several catalyst(s) such as aluminum acetylacetonate;
6) stirring (typical duration: overnight).

Typically the amount of coupling agent introduced in the scratch-resistant coating composition represents 0.1 to 15% by weight of the total composition weight, preferably 1 to 10% by weight.

The scratch-resistant coating composition can be applied using any classical method such as spin, dip or flow coating.

The scratch-resistant coating composition can be simply dried or optionally pre-cured before application of the subsequent anti-reflecting coating. Depending upon the nature of the scratch-resistant coating composition thermal curing, UV-curing or a combination of both can be added.

Thickness of the scratch-resistant coating, after curing, usually ranges from 1 to 15 μm, preferably from 1.5 to 6 μm.

The scratch-resistant coating composition may also comprise at least one hydrophobic surfactant.

By hydrophobic surfactant, there is meant a surfactant that increases the hydrophobic properties (for example decreasing the surface energy) of the cured scratch-resistant coating compared to the same cured coating without the surfactant.

Examples of surfactants are:

From Dow Corning: silicones, organosilanes, fluorosilane;

From Witco: silicones, modified trisiloxane, acrylate, modified silicone copolymer.

Preferred surfactants are fluorinated compounds and in particular fluorinated silicon compounds, in particular the fluorinated silicon compounds disclosed above.

A preferred hydrophobic surfactant is Fluorad FC 430 commercialized by 3M, or EFKA-3034 from EFKA.

EFKA-3034 is a fluorocarbon containing organically modified polysiloxane.

Amount of surfactant typically ranges from 0.01 to 0.5 wt %.

The coated lens also preferably comprises a primer coating layer for improving adhesion of the scratch-resistant coating to the lens substrate and/or impact resistance of the lens.

The primer coating can be any coating typically used for improving impact resistance and/or adhesion of the scratch-resistant coating of a finished optical article.

By definition, an impact-resistant primer coating is a coating which improves the impact resistance of the finished optical article as compared with the same optical article but without the impact-resistant primer coating.

Typical primer coatings are (meth)acrylic based coatings and polyurethane based coatings.

(Meth)acrylic based coatings are, among others, disclosed in U.S. Pat. No. 5,015,523 whereas thermoplastic and crosslinked based polyurethane resin coatings are disclosed inter alia, in Japanese Patents 63-141001 and 63-87223, EP 0 404 111 and U.S. Pat. No. 5,316,791.

In particular, the primer coating according to the invention can be made from a latex composition such as a poly(meth)acrylic latex, a polyurethane latex or a polyester latex.

Among the preferred (meth)acrylic based primer coating compositions there can be cited polyethyleneglycol(meth) acrylate based compositions such as, for example, tetraethyleneglycoldiacrylate, polyethyleneglycol (200) diacrylate, polyethyleneglycol (400) diacrylate, polyethyleneglycol (600) di(meth)acrylate, as well as urethane (meth)acrylates and mixtures thereof.

Preferably, the primer coating has a glass transition temperature (Tg) of less than 30° C.

Among the preferred primer coating compositions, there may be cited the acrylic latex commercialized under the name ACRYLIC LATEX A-639 commercialized by ZENECA and polyurethane latex commercialised under the names of W-240 and W-234 by BAXENDEN.

In a preferred embodiment, the primer coating may also include an effective amount of a coupling agent in order to promote adhesion of the primer coating to the optical substrate and/or to the scratch-resistant coating.

The same coupling agents, in the same amounts, as for the scratch-resistant coating compositions can be used with the primer coating composition.

The primer coating composition can be applied using any classical method such as spin, dip, or flow coating.

Depending upon the nature of the impact-resistant primer coating composition, thermal curing, UV-curing or a combination of both can be used.

Thickness of the primer coating, after curing, typically ranges from 0.05 to 20 μm, preferably 0.5 to 10 μm and more particularly from 0.6 to 6 μm.

The lens substrate can be made from any material used in the optical field, such as mineral or organic glass, preferably an organic glass.

Examples of such lens substrates are:
diethylene glycol bis(allylcarbonate) polymers and copolymers based substrates;
(meth)acrylic polymers and copolymers based substrates, such as substrates comprising (meth)acrylic polymers and copolymers derived from bisphenol-A;
thio(meth)acrylic polymers and copolymers based substrates;
polythiourethane polymers and copolymers based substrates;
epoxy and/or episulfide polymers and copolymers based substrates and
polycarbonate based substrates.

In an other embodiment of the invention, the initial outermost coating layer of the coated lens is comprised of an outer superficial portion of a scratch-resistant coating containing at least one hydrophobic surfactant.

The scratch-resistant coating can be any of the above described coating which includes at least one hydrophobic surfactant as disclosed above.

Preferably, the hydrophobic surfactant is a fluorinated compound and in particular silanes and silazanes bearing at least one fluorocarbon, polyfluorocarbon, fluoropolyether or polyfluoropolyether group as disclosed previously.

Typically, this outer superficial portion of the scratch-resistant coating has a thickness of 1 to 100 nm, preferably 1 to 30 nm, more preferably 1 to 10 nm, and even better 1 to 5 nm.

Otherwise, the treatment of the outer superficial portion of the scratch-resistant coating is the same as previously disclosed.

It is particularly surprising to see that, for low thicknesses (30 nm or less) of initial outermost coating layer containing fluorinated compound(s), it is possible to completely eliminate fluorine at the surface of the lens after step (b).

Indeed, no fluoroine is detectable by X-ray photoelectron spectroscopy (XPS) Al Kalpha after the treatment of step (b).

In another embodiment, the initial outermost coating can be the outermost coating obtained by a sol/gel process, of an anti-reflective stack.

The thickness of such outermost coating is generally comprised between 60 nm and 120 nm, preferably between 70 and 100 nm and has a low refractive index value, generally less or equal than 1.45 (preferably from 1.38 to 1.44).

The outermost coating layer or coating is optically functional and contributes to the AR performances of the whole stack.

The outermost coating preferably comprises a hydrolyzate of a di, tri or tetraalkoxysilane, preferably an epoxysilane hydrolyzate and optionally low refractive index filler such as $SiO_2$.

Such outermost coatings are described in, for instance, the following patents:
U.S. Pat. No. 4,590,117, U.S. Pat. No. 5,173,368, U.S. Pat. No. 5,104,692, U.S. Pat. No. 4,687,707 and EP 1 279 443 whose content is incorporated herein by reference.

In the two cited latter documents, a fluoroalkoxysilane component is used as a precursor of the final matrix constituting the initial outermost coating of the AR stack and lowering its index.

The last step of the process of the invention comprises the deposition on the treated surface obtained after step b) of a layer of a final coating having surface properties different from those of the initial outermost coating.

Preferably, the final coating has a contact angle with water of at least 100°.

Also preferably, the final coating has a surface energy of 25 $mJ/m^2$ or less, preferably of 22 $mJ/m^2$ or less and more preferably of 15 $mJ/m^2$ or less and even better of 12 $mJ/m^2$ or less.

Any coating typically used as anti-soil top coat can be used for the final coating provided it has surface properties different from those of the initial outermost coating, and in particular, improved hydrophobic properties, such as an increased contact angle with water or a lower surface energy, or a smaller hysteresis between advancing and receding contact angle of an aliphatic compound (squalene).

Preferred final coating may be any of the hydrophobic top coat disclosed hereabove, and in particular those disclosed in patent U.S. Pat. No. 6,277,485 and U.S. Pat. No. 6,183,872. This final coating may be deposited by any know process, and in particular by vacuum, dip, spin, spray or stamping coating.

Generally, the final coating has a thickness of 1 to 100 nm, preferably 2 to 60 nm, more preferably 1 to 60 nm, and even better 2 to 5 nm.

The process of the invention may further comprise a step of edging the coated lens either before treatment step (b) with activated chemical species or after this step and before step (c) of deposition of the final coating, preferably before step (b).

Performing an edging step before treatment step (b) with activated chemical species requires that the initial outermost coating layer has a surface energy relatively high, typically of at least 15 $mJ/m^2$ in order to obtain a good adhesion to the maintaining pad during the edging operation.

Alternatively, a temporary coating may be deposited on top of the initial outermost coating prior to the edging operation, which coating is thereafter eliminated.

Such temporary coating may be mineral coating, in particular a coating comprised of a metal fluoride or a mixture of metal fluorides, and metal oxide or a mixture of metal oxides.

As fluorides, there may be cited $MgF_2$, $LaF_3$, $AlF_3$ or $CF_3$.

As metal oxides, there may be cited title oxides, aluminum oxides, zirconium oxides and praseodymium oxides.

A preferred mixture is a mixture of alumina and praseodymium oxide. When made of mineral material, the thickness of the temporary layer is typically of 50 nm or less, generally of 1 to 50 nm, and preferably of 5 to 50 nm. The temporary coating may also be made of inks typically used for marking ophthalmic lenses or the resins making the binder of these inks.

In that case, it is possible to have coating of higher thicknesses than when pure mineral coatings are used. These thicknesses may range from 5 to 1.50 micrometers. Prefer resins are alkyde resins.

After the edging step, the temporary protective coating may be eliminated with a liquid medium or by dry sweeping or by combination of both.

Elimination with a liquid medium is preferably made with an acidic solution, in particular a solution of orthophosphoric acid with molarities ranging from 0.01 to 1 N.

The acidic solution may also include surfactants, anionic, cationic or amphotere.

After elimination of the temporary protective coating, the initial outermost coating layer of the coated lens may be subjected to the treatment with activated chemical species (b).

Subjecting the coated lens to an edging step before treatment with activated chemicals species (b) is preferred. However, it is also possible to edge the lenses after treatment (b). In this situation, no temporary coating will be required as treatment with activated chemical species typically results in an outer surface of the coated lens which has the required property of adhesion to the maintaining pad of the edging apparatus.

Thus, the edging step can be easily performed before step (b) and without the need of a temporary protective coating.

EXAMPLES 1 AND 2 AND COMPARATIVE EXAMPLES A TO C

Various coated lenses are treated using steps (a) and (b) of the process of the invention and for comparison using a vacuum oxygen plasma instead of the treatment step (b) of the invention.

The contact angles with water and the surface energy of the lens surface after treatment were measured and calculated and homogeneity was determined.

The compositions and structures of the coated lenses, the parameters of the treatments and the results are given below:

Coated Lens n°1

The lens is coated, starting from the substrate, with a primer coating, a scratch-resistant coating, an anti-reflective stack and a hydrophobic top coat.

Substrate:

Composition: polymerized diethylene glycol diallyl carbonate (CR39®-ORMA® lens from ESSILOR)

Primer Coating:

| Composition: | polyurethane latex W 234 from Baxenden. |
|---|---|
| Thickness: | about 1 μm. |
| Deposition process: | dip coating |

Scratch-Resistant Coating

| Composition | Parts by weight |
|---|---|
| γ-glycidoxypropyltrimethoxysilane | 224 |
| HCl 0.1N | 80.5 |
| Dimethyldiethoxy silane | 120 |
| Colloïdal silica (30% in methanol) | 718 |
| Aluminum acetylacetonate | 15 |
| Ethylcellosolve | 44 |
| Hydrophobic surfactant (FLUORAD, FC430 from 3M) | 0.1% of the total weight of the composition |

Thickness: about 3.5 μm

Deposition process: dip coating

Anti-Reflective Coating

Stack of 4 mineral layers comprising, starting from the layer closest to the substrate.

| Composition | Optical thickness (nm) at λ = 550 nm |
|---|---|
| First layer: $ZrO_2$ | 55 |
| Second layer: $SiO_2$ | 30 |
| Third layer $ZrO_2$ | 160 |
| Fourth layer: $SiO_2$ | 120 |

The layers are vacuum deposited.

| | Hydrophobic top coat |
|---|---|
| Composition: | Fluorosilazane commercialized by SHIN ETSU under the name KP 801M |
| Thickness: | 2 to 5 nm |
| Deposition process: | Evaporation |

Treatment N°1

This treatment is a corona discharge treatment at atmospheric pressure according to the invention having the following characteristics

| Type of treatment: | Corona discharge |
|---|---|
| Pressure: | 750–760 mm Hg |
| Power: | 800 W |
| Active species: | Free radicals |
| Duration: | 10 seconds |

Treatment N°2

This treatment is the same as treatment n°2 but with a duration of 20 seconds.

Treatment N°3

This treatment is an oxygen plasma treatment under vacuum which is outside the scope of the present invention having the following characteristics.

| Type of treatment: | oxygen plasma |
|---|---|
| Pressure: | 200 mbars |
| Power: | 600 W |
| Active species: | Ions |
| Duration: | 20 seconds |

Treatment N°4

This treatment is an oxygen plasma treatment under vacuum which is outside the scope of the present invention having the following characteristics.

| Type of treatment: | oxygen plasma |
|---|---|
| Pressure: | 200 mbars |
| Power: | 600 W |
| Active species: | Ions |
| Duration: | 10 seconds |

Treatment N°5

This treatment is an oxygen plasma treatment under vacuum which is outside the scope of the present invention having the following characteristics.

| Type of treatment: | oxygen plasma |
|---|---|
| Pressure: | 300 mbars |
| Power | 300 W |
| Active species | Ions |
| Duration: | 10 seconds |

EXAMPLES 3 TO 5 AND COMPARATIVE EXAMPLE D TO F

Various coated lenses were treated according to the process of the invention. After the treatment with the active chemical species, the treated lenses were coated by dipping in a 0.1 weight % OPTOOL DSX solution in perfluorohexane and the lenses were heated in an oven at 50° C. for 3 hours.

The obtained lenses are submitted to an adhesion test: Following is the protocole.

The lenses were then dipped a first time in perfluorohexane for 1 minute.

Contact angle with water of the lens surface was measured both before and after dipping in the solvent at 21° C.+/−1° C.

Ink test was also performed before and after dipping in solvent.

The lenses are thereafter dipped a second time for 2 minutes in the solvent. The resulting lenses are submitted to the ink test.

The characteristics of the coated lenses, if different from lens n°1, are given below.

For comparison, similar lenses which have not been treated according to the invention are submitted to the same dipping in the solvent (contact angles with water and ink test are measured and performed for these lenses).

If the ink test fails, it means that the hydrophobic coating OPTOOL DSX has eluted in the perfluorohexane solution, which demonstrates a bad adhesion.

Results are given in Table II.

Coated Lens n°2

This lens comprises only a substrate and a scratch-resistant coating containing a hydrophobic surfactant.

| Substrate: | as in lens n°1 |
|---|---|
| Scratch-resistant Coating: | as in lens n°1. |

Coated Lens n°3

Similar to coated lens n°2 but scratch-resistant coating does not include any hydrophobic surfactant.

TABLE I

| Example n° | Coated lens n° | Treatment n° | Surface Energy after treatment (mJ/m$^2$) | Contact angle with water after treatment | Homogeneity |
|---|---|---|---|---|---|
| Comparative A | 1 | 3 | >70 to 50 (*) | — | 0 |
| Comparative B | 1 | 4 | >70 to 50 (*) | 60° | 0 |
| Comparative C | 1 | 5 | >70 to 50 (*) | — | 0 |
| 1 | 1 | 1 | >70 | <5° | + |
| 2 | 1 | 2 | >70 | <5° | + |

(*) depending on the position of the measurements on the lens surface

0 = not good

+ = good

TABLE II

| Example n° | Coated lens n° | Treatment n° | Contact angle with water before treatment | Contact angle with water after deposition of OPTOOL DSX and before 1st dip in solvent | Ink test before 1st dip | Contact angle with water after 1st dip | Ink test after 1st dip | Ink test after 2nd dip |
|---|---|---|---|---|---|---|---|---|
| 3 | 1 | 2 | 113° | 112.18° | Pass | 116.6° | Pass | Pass |
| Comparative D | 1 | No | 113° | 112.9° | Pass | — | Fail | Fail |
| 4 | 2 | 2 | 70° | 112.9° | Pass | 113.1° | Pass | Pass |
| Comparative E | 2 | No | 70° | 111.3° | Pass | 105.8° | Pass | Fail |
| 5 | 3 | 2 | 64° | 109.9° | Pass | 109.8° | Pass | Pass |
| Comparative F | 3 | No | 64° | 106.6° | Pass | 106.4° | Pass | Fail |

OPTOOL DSX: Compound comprising perfluoropropylene groups commercialized by DAIKIN Contact angles with water was measured:
At ambiant temperature T°=21° C.+/−1° C.
And relative humidity Rh=55%+/−5%
With a goniometer FTA 200 series from First Ten Angstroms.
The volume of the drop is 6 µl.

Surface energy was calculated according to the model of OWENS-WENDT 2 components using the FTA 32 version 2.0 software or by using "the wetting tension tests kits" by Lectro treat following ASTM D-2578-67 procedure.

Ink test was effected by depositing a line of Magic ink n°500 from Teranishi Chemical Industries Ltd on the treated or coated surface of the lens.

If the Magic ink line forms discrete dots, the lens is said to pass the test and if the Magic ink line forms a continuous line, the lens is said to fail the test.

This test is a determination of the surface properties of the lens.

In order to show that there are significant different surface properties between the lenses having a coating replaced according to the invention and the initial lenses, i.e. before submitted to the process of the invention, several measurements are implemented using an apparatus FTA 200 series from First Ten Angstrom on lenses obtained in previous examples 3 and 4 and the initial lenses (coated lenses 1 and 2).

The liquid used to measure the properties is an aliphatic compound: squalene.

Between 4 to 5 µl of the desire chemical (squalene for those experiments) are deposited on the surface of each tested lens. The needle is left into drop and the pump is activated with the following program
5 mL of squalene are added in 10 s
the pump is stopped for 5 s
5 mL of squalene are added for 10 s
the pump is stopped for 5 s (more than 10 mL of squalene are actually deposited due to the fact that the deposition still goes on a certain time after stopping the pump)
15 mL of squalene are removed in 10 s
the pump is stopped for 5 s
10 mL of squalene are added for 10 s
the pump is stopped for 4 s
15 mL of squalene are removed in 10 s
the pump is stopped for 5 s.
80 images are recorded throughout this process and the contact angles for each of those images are measured.

This allowed us to draw the graph contact angle function of time. From this graph, it is then easy to measure the hysteresis.

TABLE III

Static contact angle and hysteresis of squalene on different substrates

| Substrate | Static contact angle | Hysteresis |
|---|---|---|
| Coated lens n°2 | 50° | 13.6° |
| Ex. 4 | 70° | 7.2° |
| Coated lens n°1 | 80° | 14.8–16.8° |
| Ex. 3 | 70° | 8.3° |

Coated lens n°2 and 1 are initial lenses, before any treatment, and had been defined previously.

It clearly appears that final lenses, after treatment n°2 and OPTOOL DSX deposition have a far better hysteresis compared to initial lenses.

The invention claimed is:

1. A process comprising:
   (a) providing a coated optical lens having an initial outermost coating layer having a surface contact angle with water of at least 65°;
   (b) subjecting the initial outermost coating layer to a treatment with activated chemical species at about atmospheric pressure, and for less than one minute, in order there is obtained a treated surface having a contact angle with water of 10° or less ; and
   (c) depositing on said treated surface a layer of a final coating having surface properties different from those of said initial outermost coating.

2. The process of claim 1, wherein the duration of the treatment with activated species (b) is 40s or less.

3. The process of claim 1, wherein the duration of the treatment with activated species (b) is about 20 s.

4. The process of claim 1, wherein said treated surface has a contact angle with water of 7° or less.

5. The process of claim 1, wherein said treated surface has a contact angle with water of 5° or less.

6. The process of claim 1, wherein the active chemical species are essentially free radicals.

7. The process of claim 6, wherein said free radicals are oxygen free radicals.

8. The process of claim 1, wherein the treatment with activated chemical species is a corona discharge treatment.

9. The process of claim 8, wherein the power of the corona discharge treatment ranges from $10^2$ to $2.10^3$ W.

10. The process of claim 8, wherein the power of the corona discharge treatment ranges from $5.10^2$ to $10^3$ W.

11. The process of claim 1, wherein the treatment with activated chemical species is a $O_2$ plasma treatment.

12. The process of claim 1, wherein said initial outermost coating has a surface energy of at least 15 mJ/m².

13. The process of claim 1, wherein the final coating has a contact angle with water of at least 100°.

14. The process of claim 1, wherein the final coating has a surface energy of 25 mJ/m² or less.

15. The process of claim 1, wherein the final coating has a surface energy of 22 mJ/m² or less.

16. The process of claim 1, wherein the final coating has a surface energy of 15 mJ/m² or less.

17. The process of claim 1, wherein the final coating has a surface energy of 12 mJ/m² or less.

18. The process of claim 1, wherein said initial outermost coating layer is a hydrophobic top coat made from a composition comprising at least one fluorinated compound.

19. The process of claim 18, wherein the fluorinated compound is selected from silanes and silazanes containing at least one fluorocarbon, polyfluorocarbon, fluoropolyether or polyfluoropolyether group.

20. The process of claim 1, wherein said initial outermost coating layer is deposited on an anti-reflective coating.

21. The process of claim 20, wherein said anti-reflective coating comprises a stack of alternative low and high refractive index mineral layers.

22. The process of claim 20, further comprising a scratch-resistant coating.

23. The process of claim 20, wherein said initial outermost coating layer has a thickness of 1 to 100 nm.

24. The process of claim 20, wherein said initial outermost coating layer has a thickness of 1 to 5 nm.

25. The process of claim 1, wherein said final coating has a thickness ranging from 1 to 100 nm.

26. The process of claim 1, wherein said final coating is deposited by vacuum, dip, spin, spray or stamping coating.

27. The process of claim 1, wherein said initial outermost coating layer comprises an outer superficial portion of a scratch-resistant coating containing at least one hydrophobic surfactant.

28. The process of claim 27, wherein the hydrophobic surfactant is a fluorinated compound.

29. The process of claim 28, wherein the fluorinated compound is a silane or silazane bearing at least one fluorocarbon, polyfluorocarbon, fluoropolyether or polyfluoropolyether group.

30. The process of claim 27, wherein the outer superficial portion has a thickness of 1 to 100 nm.

31. The process of claim 1, further comprising air blowing during treatment with activated chemical species to uniformize the action of the reactive chemical species.

32. The process of claim 1, further comprising the step of edging the lens after steps (a) or (b).

33. The process of claim 1, further comprising the step of edging the lens after step (a).

34. The process of claim 1, wherein said optical lens is an ophthalmic lens.

35. The process of claim 1, wherein the initial outermost coating layer is replaced by the final coating.

36. The process of claim 1, wherein the final coating is deposited on the initial outermost coating.

37. The process of claim 1, wherein the duration of the treatment with activated species (b) is 30 seconds or less.

38. The process of claim 20, wherein said initial outermost coating layer has a thickness of 1 to 60 nm.

39. The process of claim 20, wherein said initial outermost coating layer has a thickness of 10 to 60 nm.

40. The process of claim 27, wherein the outer superficial portion has a thickness of 1 to 30 nm.

41. The process of claim 22, further comprising a primer coating layer.

* * * * *